United States Patent
Oldacre

(10) Patent No.: US 10,178,207 B1
(45) Date of Patent: Jan. 8, 2019

(54) OPTIMIZED DEFRAGMENTATION OF DATA PACKETS IN A PASSIVE OPTICAL NETWORK

(71) Applicant: ADTRAN, Inc., Huntsville, AL (US)

(72) Inventor: Jared Oldacre, Vinemont, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 15/645,172

(22) Filed: Jul. 10, 2017

(51) Int. Cl.
*H04B 10/27* (2013.01)
*H04B 10/50* (2013.01)
*H04B 10/60* (2013.01)
*H04L 29/06* (2006.01)
*H04L 29/08* (2006.01)

(52) U.S. Cl.
CPC .......... *H04L 69/22* (2013.01); *H04B 10/27* (2013.01); *H04B 10/50* (2013.01); *H04B 10/60* (2013.01); *H04L 67/2842* (2013.01); *H04L 69/324* (2013.01)

(58) Field of Classification Search
None
See application file for complete search history.

(56) References Cited

U.S. PATENT DOCUMENTS

2010/0027545 A1* 2/2010 Gomes ............... H04L 45/00 370/392
2015/0381367 A1* 12/2015 Zarcone ............. H04L 9/3242 713/170
2017/0339206 A1* 11/2017 Holden .............. H04L 65/604

* cited by examiner

*Primary Examiner* — Darren E Wolf
(74) *Attorney, Agent, or Firm* — Fish & Richardson P.C.

(57) ABSTRACT

Methods, systems, and apparatus, for receiving, by an optical line terminal, an upstream communication frame from an optical network terminal, the upstream communication frame including a data packet and a last fragment bit; determining, by the optical line terminal, a fragmentation of the data packet of the upstream communication frame; and processing, by the optical line terminal, the data packet of the upstream communication packet based on the fragmentation of the data packet, including: when the data packet is fragmented, examining a last fragment bit of the upstream communication frame, and storing, in a memory device, the data packet when a state of the last fragment bit indicates that the data packet is not a completion; and when the data packet is not fragmented, transmitting the data packet upstream without storing the data packet in the memory device.

20 Claims, 5 Drawing Sheets

OPTIMIZED DEFRAGMENTATION OF DATA PACKETS IN A PASSIVE OPTICAL NETWORK

FIELD

The present specification relates to defragmentation of data packets in a passive optical network.

BACKGROUND

A passive optical network (PON) is a telecommunications technology that implements a point-to-multipoint architecture in which an optical fiber is able to serve multiple end-points without having to provision individual fibers between a hub and a consumer. A PON can include an optical line terminal (OLT) at the service provider's central office (hub) and any number of optical network terminals (ONTs) near end users. In a PON, data rates are increasing to 10 Gbps, and 25 Gbps in the near future. However, demand for peak data rates may exceed the rate of installed equipment such that multiple wavelengths may be used to increase capacity.

SUMMARY

Innovative aspects of the subject matter described in this specification may be embodied in methods that include the actions of receiving, by an optical line terminal, an upstream communication frame from an optical network terminal, the upstream communication frame including a data packet and a last fragment bit; determining, by the optical line terminal, a fragmentation of the data packet of the upstream communication frame; and processing, by the optical line terminal, the data packet of the upstream communication packet based on the fragmentation of the data packet, including: when the data packet is fragmented, examining a last fragment bit of the upstream communication frame, and storing, in a memory device, the data packet when a state of the last fragment bit indicates that the data packet is not a completion; and when the data packet is not fragmented, transmitting the data packet upstream without storing the data packet in the memory device.

Other embodiments of these aspects include corresponding systems and apparatus.

These and other embodiments may each optionally include one or more of the following features. For instance, storing the data packet in a cache after receiving the upstream communication frame. Determining that the last fragment bit indicates that the data packet is a completion; determining that a state of a state memory indicates that a previously fragmented data packet was not received; based on determining that the last fragment bit indicates that the data packet is a completion and determining that the state of the state memory indicates that a previously fragmented data packet was not received: providing a signal to a write ready queue; and in response to the signal, transmitting the data packet upstream to a packet buffer without storing the data packet in the memory device. Determining that the last fragment bit indicates that the data packet is not a completion; determining that a state of a state memory indicates that a previously fragmented data packet was not received; and based on determining that the last fragment bit indicates that the data packet is not a completion and determining that the state of the state memory indicates that a previously fragmented data packet was not received, determining that the data packet is an initial fragmented data packet, and in response, i) setting an initial state of the state memory, and ii) storing, in the memory device, the data packet. Storing, in the memory device, the data packet further comprises: providing a signal to a write ready queue; and in response to the signal, storing, in the memory device, the data packet.

The features further include, for example, determining that the last fragment bit indicates that the data packet is not a completion; determining that a state of a state memory indicates that a previously fragmented data packet was received; and based on determining that the last fragment bit indicates that the data packet is not a completion and determining that the state of the state memory indicates that a previously fragmented data packet was received, determining that the data packet is a subsequent fragmented data packet, and in response, storing, in the memory device, the data packet. Determining that the last fragment bit indicates that the data packet is a completion; determining that a state of a state memory indicates that a previously fragmented data packet was received; based on determining that the last fragment bit indicates that the data packet is a completion and determining that the state of the state memory indicates that a previously fragmented data packet was received: i) obtaining one or more previous data packets that are previously stored in the memory device, the one or more previous data packets associated with the completion data packet, and ii) concatenating the one more previous data packets with the completion data packet. Obtaining the one or more previous data packets that are stored in the memory device further comprises: providing a signal to a read ready queue; and in response to the signal, obtaining the one or more previous data packets from the memory device. Concatenating the one or more previous data packets with the completion data packets: providing a signal to a write ready queue; and in response to the signal, concatenating the one more previous data packets with the completion data packet.

Innovative aspects of the subject matter described in this specification may be embodied in systems that include a parser module configured to i) receive an upstream communication frame from an optical network terminal, the upstream communication frame including a data packet and a last fragment bit and ii) determine a fragmentation of the data packet of the upstream communication frame; a memory device configured to store the data packet of the upstream communication frame; and a defragmentation engine configured to: i) examine, when the data packet is fragmented, the last fragment bit of the upstream communication frame, and store, in the memory device, the data packet when the state of the last fragment bit indicates that the data packet is not a completion, and ii) transmit, when the data packet is not fragmented, the data packet upstream without storing the data packet in the memory device.

Other embodiments of these aspects include corresponding methods.

These and other embodiments may each optionally include one or more of the following features. For instance, the system further comprising a cache configured to store the data packet after receiving the upstream communication frame. The parser module is further configured to i) determine that the last fragment bit indicates that the data packet is a completion, and ii) determine that a state of a state memory indicates that a previously fragmented data packet was not received, and in response, provide a signal to a write ready queue, wherein the defragmentation engine is further configured to transmit the data packet upstream to a packet buffer without storing the data packet in the memory device in response to the signal. The parser module is further configured to i) determine that the last fragment bit indicates that the data packet is not a completion, and ii) determine that a state of a state memory indicates that a previously fragmented data packet was not received, and in response, determine that the data packet is an initial fragmented data packet, and set an initial state of the state memory. In response to determining that the data packet is an initial fragmented data packet, the defragmentation engine is further configured to store, in the memory device, the data packet. The parser module is further configured to provide a signal to a write ready queue, wherein the defragmentation engine is further configured to store, in the memory device, the data packet in response to the signal.

The features further include, for example, the parser module is further configured to i) determine that the last fragment bit indicates that the data packet is not a completion, and ii) determine that a state of a state memory indicates that a previously fragmented data packet was received, and in response determine that that the data packet is a subsequently fragmented data packet. The parser module is further configured to, in response to determining that that the data packet is a subsequently fragmented data packet, provide a signal to a write ready queue, wherein the defragmentation engine is further configured to store, in the memory device, the data packet in response to the signal. The parser module is further configured to i) determine that the last fragment bit indicates that the data packet is a completion, and ii) determine that a state of a state memory indicates that a previously fragmented data packet was received, and in response to determining that the last fragment bit indicates that the data packet is the completion, the defragmentation engine is further configured to i) obtain one more previous data packets that are previously stored in the memory device, the one or more previous data packets associated with the completion data packet, and ii) concatenate the one more previous data packets with the completion data packet. The parser module is further configured to provide a signal to a read ready queue, wherein the defragmentation engine is further configured to obtain the one or more previous data packets from the memory device in response to the signal. The parser module is further configured to provide a signal to a write ready queue, wherein the defragmentation engine is further configured to concatenate the one or more previous data packets with the completion data packet.

Particular implementations of the subject matter described in this specification can be implemented so as to realize one or more of the following advantages. For example, improved processing of data packets in a passive optical network. Such improvements can improve the speed of the passive optical network, particularly for upstream communication. In particular, the techniques described in this document can increase a line rate of the passive optical network. The techniques described in this document enable an OLT to only store fragmented data packets, while transmitting other data packets upstream without having to store those other data packets. This differs from previous techniques in which an OLT would store all data packets. As such, the techniques discussed herein require less physical storage (e.g., less memory) than previous techniques, such that it is more practical to utilize high speed random access memory (e.g., double data rate type 3 ("DDR3") memory) to store those fragmented data packets. The ability to use high speed random access memory rather than slower memory types enables the OLT to provide a higher upstream line rate than that provided by previous techniques that stored all upstream data packets. As such, the functioning of the OLT is improved (e.g., requiring less memory, and providing higher data rates) through the use of the techniques described herein.

The details of one or more embodiments of the subject matter described in this specification are set forth in the accompanying drawings and the description below. Other potential features, aspects, and advantages of the subject matter will become apparent from the description, the drawings, and the claims.

DETAILED DESCRIPTION

This document describes a system and a method that, within a passive optical network, determines a state of a data packet of an upstream communication frame that is transmitted upstream from an optical network terminal (ONT) to an optical line terminal (OLT), and based on the state, appropriately processes the data packet. For example, a received data packet can be a completed data packet that is passed upstream by the OLT without storing the data packet in a memory device. Meanwhile, another received data packet can be an initially fragmented data packet of a series of associated fragmented data packets (e.g., a series of fragmented data packets that should be defragmented). The initially fragmented data packet is stored by the memory device, and a state of a state memory associated with the data packet is set to indicate such. After storing the initially fragmented data packet, a later-received data packet can be a subsequently fragmented data packet of the series of associated fragmented data packets. The subsequently fragmented data packet is stored by the memory device. After storing the subsequently fragmented data packet, another later-received data packet can be a completion fragmented data packet that completes the series of fragmented data packets in this example. The completion fragmented data packet and the associated fragmented data packets are concatenated together to defragment the data packets, and then the defragmented data packets are transmitted upstream. Thus, as shown by this example, and described in more detail throughout this document, an OLT can pass an unfragmented data packet upstream without storing it, while storing received fragments until the completion fragment is received. Once the completion fragment is received, the OLT can then defragment the packets and transmit the defragmented packets upstream.

Figure 1:
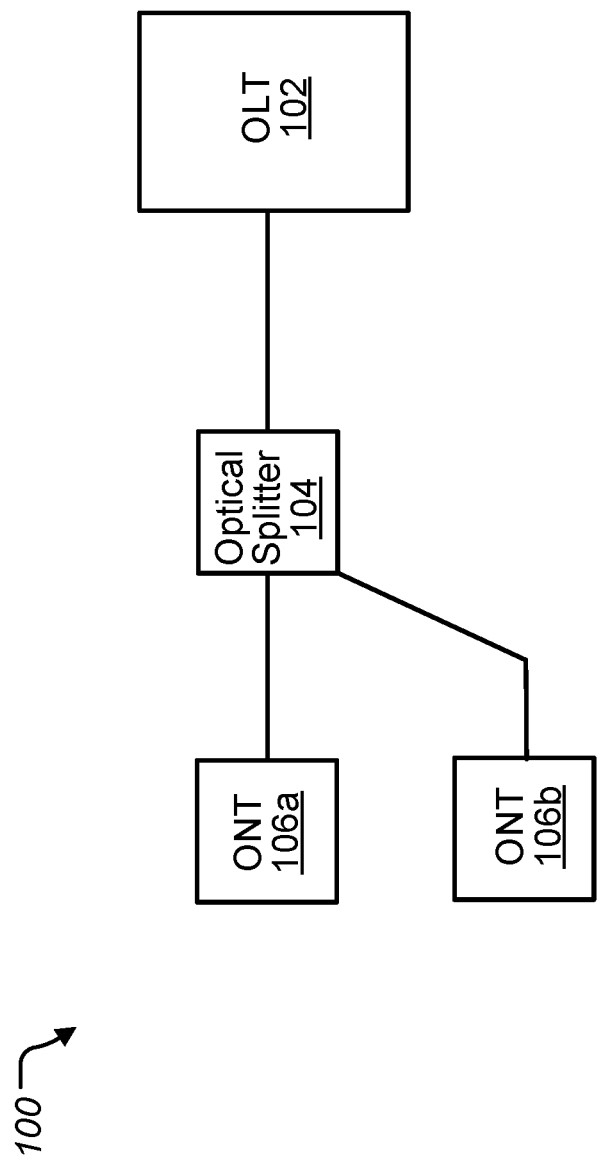
FIG. 1 depicts an example passive optical network.

FIG. 1 illustrates a passive optical network (PON) 100. The PON 100 includes an optical line terminal (OLT) 102, an optical splitter 104, and optical network terminals (ONTs) 106*a*, 106*b*. The PON 100 can include any number of ONTs depending on the desired application.

In general, the OLT 102 serves as a service provider endpoint (or hub) of the PON 100. The OLT 102 is in communication with the optical splitter 104 and provides (during downstream communication) an optical signal to the optical splitter 104. The optical splitter 104 branches the optical signal (during downstream communication) to each of the ONTs 106a, 106b. Each of the ONTs 106a, 106b serve to provide the optical signal to associated consumers (e.g., as voice telephone, television, internet access).

During upstream communication, the OLT 102 allocates (e.g. schedules) bandwidth to each of the ONTs 106 (106a, 106b) such that the ONTs 106 can provide data bursts (upstream communication frames) as appropriate to the OLT 102. In some examples, during a scheduled data burst by one of the ONTs 106, the ONT 106 will fragment the associated data packet of the upstream communication frame such that the assigned bandwidth is occupied (e.g., optimized). In some examples, the OLT 102 will store the fragmented data packets in a memory device. However, in some examples, the storage rate associated with the memory device can be slower than the data rate associated with the PON 100—and thus, an overall performance of the PON 100 may be hindered. For example, for a PON associated with a data rate of 10 Gigabits per second (Gbps), a bottleneck is formed at the memory device. The conditional storage techniques discussed further below eliminate that bottleneck by selectively passing completed packets (e.g., packets that are not fragments) upstream without storing them, thereby freeing up the memory for purposes of processing received fragments.

Figure 2:
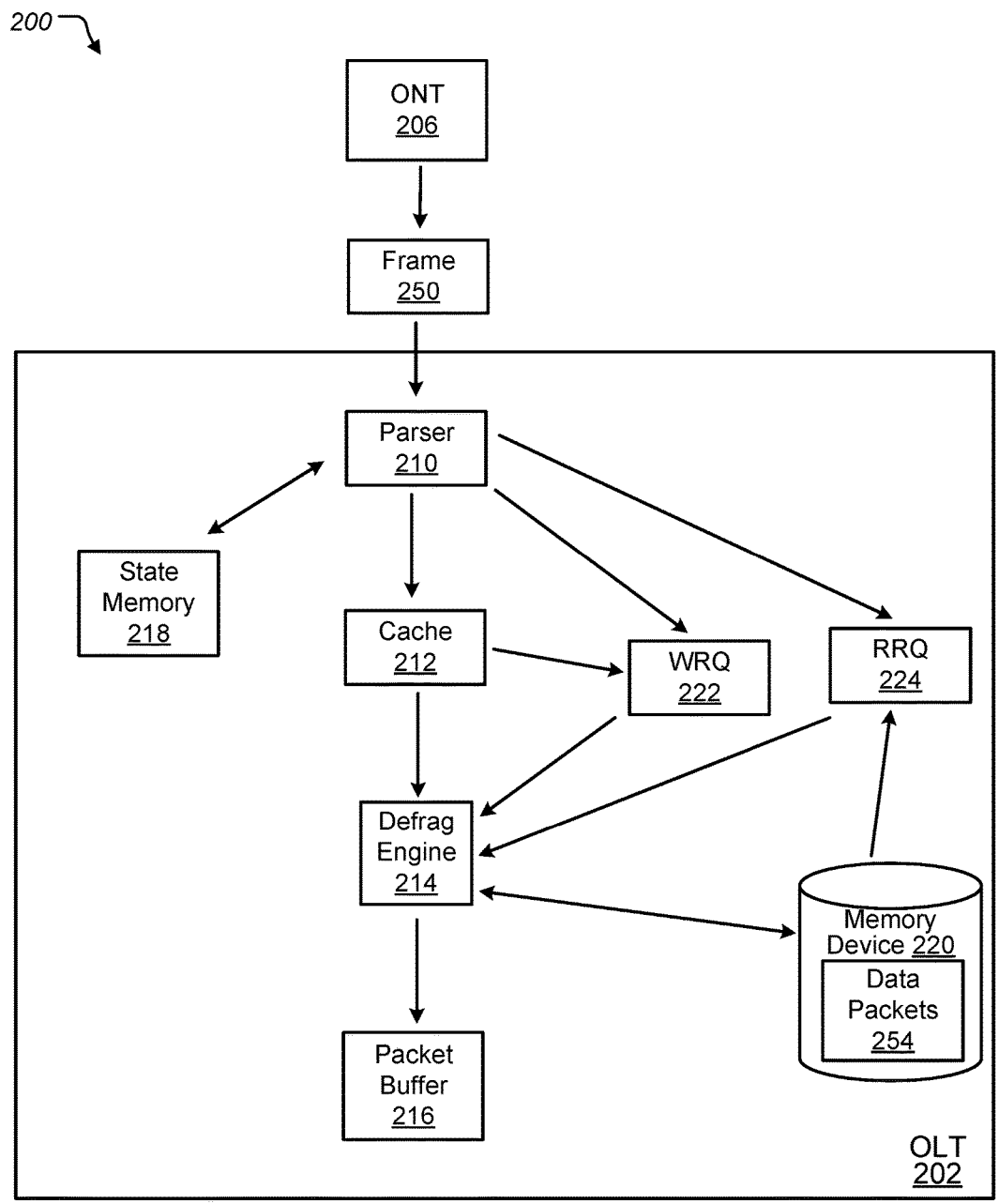
FIG. 2 depicts an example of a portion of a passive optical network.

FIG. 2 illustrates a portion of a PON 200. The PON 200 includes an OLT 202 and an ONT 206, similar to the OLT 102 and the ONT 106 described above with respect to FIG. 1. The ONT 206 can be one of the ONTs 106 of FIG. 1. The ONT 206 is in communication with the OLT 202. The OLT 202 includes a parser module 210, a cache 212, a defragmentation engine 214, a packet buffer 216, a state memory 218, a memory device 220, a write-ready queue (WRQ) 222, and a read-ready queue (RRQ) 224.

Figure 4:
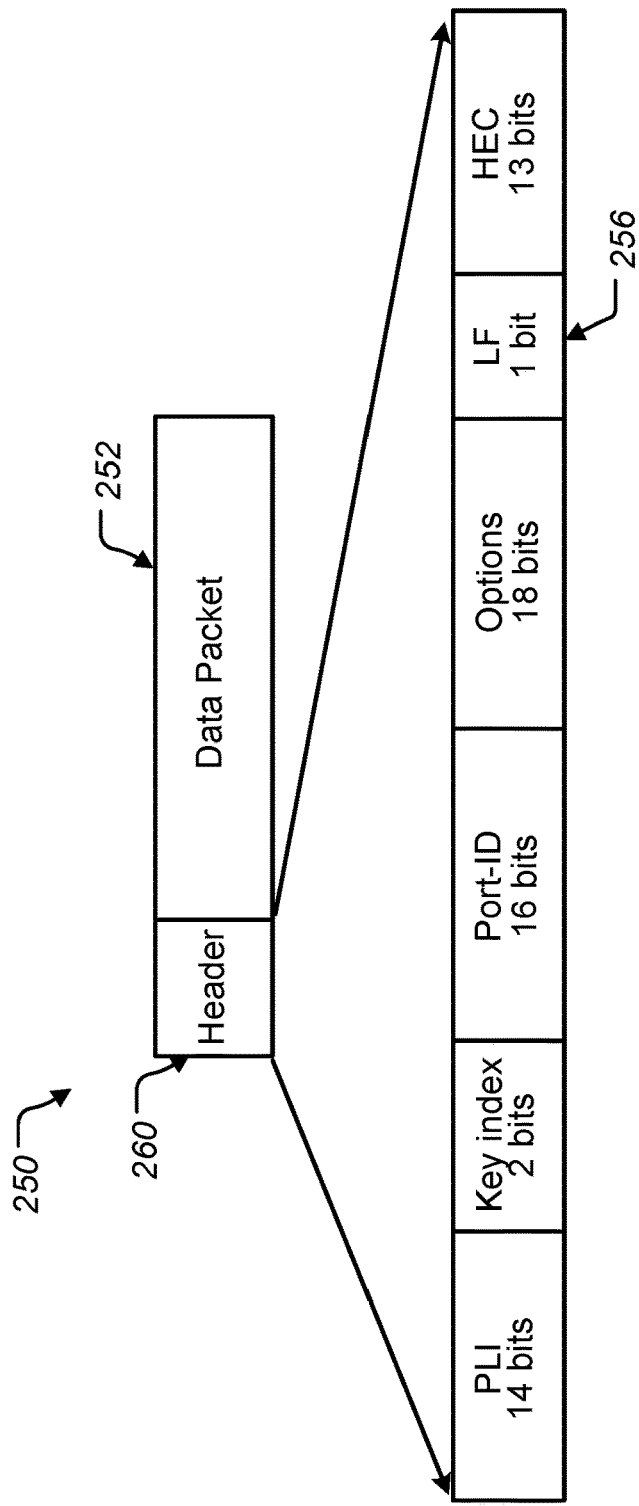
FIG. 4 depicts an example upstream communication frame.

The ONT 206 is configured to provide an upstream communication frame 250 to the OLT 202, e.g., over a logical connection (port) associated with a particular upstream data flow. As shown in FIG. 4, the upstream communication frame 250 can include a data packet (payload) 252 and a header portion 260 that includes a last fragment (LF) bit 256. The header portion 260 can include other identifying bits, such as key index bits and options bits. The LF bit 256 indicates whether the data packet 252 (e.g., a service data unit—SDU) is a last fragmented data packet of a series of associated fragmented data packets.

The parser module 210 is configured to receive the upstream communication frame 250 from the ONT 206, e.g., during a scheduled burst from the ONT 206. The parser module 210 is also configured to determine a fragmentation of the data packet 252 by examining a state of the state memory 218, described further herein.

The cache 212 is configured to receive the data packet 252 from the parser module 210 and store the data packet 252. In some examples, the cache 212 stores the data packet 252 immediately upon receipt by the parser module 210. In some examples, the cache 212 temporarily stores the data packet 252.

The defragmentation engine 214 is configured to examine the LF bit 256 of the upstream communication frame 250. In some examples, the defragmentation engine 214 provides the data packet 252 to the memory device 220 for storage, described further herein. In some examples, the defragmentation engine 214 transmits the data packet 252 to the packet buffer 216 without storing the data packet 252 in the memory device 220, described further herein.

The memory device 220 is configured to store data packets, e.g., the data packet 252 or previously received data packets 254. In some examples, the memory device 220 is a DDR3 memory device.

The state memory 218 is configured to store a state associated with the data packet 252. The state of the state memory 218 can be updated upon reception of the upstream communication frame 250 by the OLT 202. In some examples, the state of the data packet 252 can indicate a fragmentation state of the data packet 252 that is provided over the particular port between the ONT 206 and the OLT 202. For examples, the fragmentation state can include if a previously fragmented data packet was received (e.g., over the particular port between the ONT 206 and the OLT 202). The state of the state memory 218 can further indicate a memory address of the previously received data packets 254 within the memory device 220.

Figure 3:
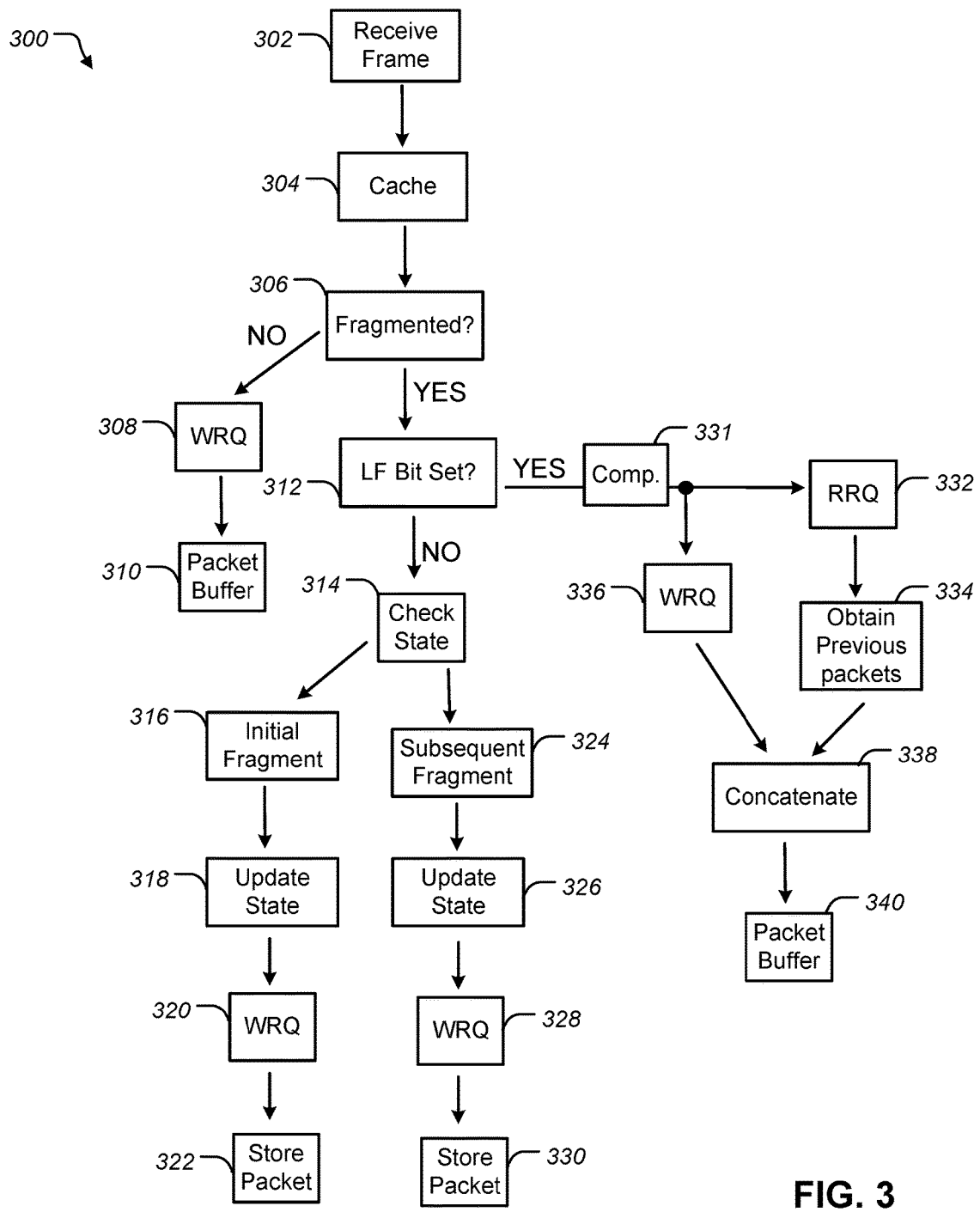
FIG. 3 depicts a flowchart of an example process for determining a state of a data packet.

FIG. 3 illustrates a flowchart of an example process 300 of determining a state of the data packet 252. In short, the data packet 252 can have one of four states: i) a completed data packet, ii) an initial fragmented data packet, iii) a subsequent fragmented data packet, and iv) a final fragmented data packet.

The OLT 202 receives the upstream communication frame 250 from the ONT 206 (302). The OLT 202 temporarily holds the data packet 252 of the upstream communication frame 250 in the cache 212 (304). Note that the data packet 252 is held in cache for purposes of determining whether to store the data packet 252 in persistent memory (e.g., RAM).

The parser module 210 determines the fragmentation of the data packet 252 (306). For example, the parser module 210 determines a (fragmentation) state of the state memory 218 and examines the state of the LF bit 256 to determine whether the data packet 252 has a completed data packet state. The state of the state memory 218 can indicate that a previously fragmented data packet was not received (e.g., over the particular port between the ONT 206 and the OLT 202); and that the state of the LF bit 256 indicates that the data packet 252 is a last data packet (e.g., of a series of one or more data packets). The parser module 210 can determine the state of the LF bit 256 by examining whether the LF bit 256 is set (e.g., value of "1") indicating that the data packet 252 is the last data packet or not set (e.g., value of "0") indicating that the data packet is not the last data packet.

Based on the state of the state memory 218 indicating that a previously fragmented data packet was not received, and the state of the LF bit 256 indicating that the data packet 252 is a last data packet, the parser module 210 determines that the data packet 252 has a completed data packet state. The parser module 210, in response, provides a signal to the write-ready queue 222 (308). In response to the signal, the defragmentation engine 214 transmits the data packet 252 upstream from the cache 212 to the packet buffer 216 without storing the data packet 252 in the memory device 220 (310).

In some examples, the parser module 210 determines that the data packet 252 is fragmented. Specifically, the parser module 210 determines the state of the LF bit 256 (312). The parser module 210 can determine the state of the LF bit 256 by examining whether the LF bit 256 is set (e.g., value of "1") or not set (e.g., value of "0"). By determining the state of the LF bit 256 and determining the state of the state memory 218, the parser module 210 determines whether the data packet 252 is an initially fragmented data packet, a subsequently fragmented data packet or a completion data packet, as described further herein.

In some examples, the parser module 210 determines that the LF bit 256 is not set (e.g., a value of "0") indicating that the data packet 252 is not a completion (e.g., of a series of previously received associated data packets). In response, the parser module 210 identifies the state of the state memory 218 associated with the data packet 252 (314).

In some examples, the parser module 210 determines that the data packet 252 is an initial fragmented data packet (316). For example, the parser module 210 determines that the state of the state memory 318 indicates that a previously fragmented data packet was not received (e.g., over the particular port between the ONT 206 and the OLT 202). In other words, as a previously fragmented data packet was not received, and the LF bit not set, the parser module 210 determines that the data packet 252 is an initial fragmented data packet. The parser module 210, in response to the data packet 252 being an initial fragmented data packet, updates the state of the state memory 218 to indicate a) that a fragmented data packet has been received (e.g., over the particular port between the ONT 206 and the OLT 202) and b) a memory address in the memory device 220 at which the data packet 252 will be stored.

Additionally, the parser module 210, in response to the data packet 252 being an initial fragmented data packet, provides a signal to the write-ready queue 222 (320). The signal triggers the defragmentation engine 214 to obtain the data packet 252 from the cache 212 and store the data packet 252 in the memory device 220 (322), e.g., at the memory address indicated by the state memory 218.

In some examples, the parser module 210 determines that the data packet 252 is a subsequently fragmented data packet (324). For example, the parser module 210 determines that the state of the state memory 218 indicates that a previously fragmented data packet was received (e.g., over the particular port between the ONT 206 and the OLT 202). In other words, as a previously fragmented data packet was received, and the LF bit not set, the parser module 210 determines that the data packet 252 is a subsequently fragmented data packet. The parser module 210, in response to the data packet 252 being a subsequently fragmented packet, updates the state of the state memory 218 to indicate a memory address in the memory device 220 where the data packet 252 will be stored.

Additionally, the parser module 210, in response to the data packet 252 being a subsequently fragmented packet, provides a signal to the write-ready queue 222 (328). In a manner similar to that discussed above, the signal triggers the defragmentation engine 214 to obtain the data packet 252 from the cache 212 and store the data packet 252 in the memory device 220 (330), e.g., at the memory address indicated by the state memory 218.

In some examples, the parser module 210 determines that the LF bit 256 is set (e.g., a value of "1"). Further, in response, the parser module 210 determines that the state of the state memory 218 indicates that a previously fragmented data packet was received (e.g., over the particular port between the ONT 206 and the OLT 202). As a result, the parser module 210 determines that the data packet 252 is a completion (e.g., of a series of previously received associated data packets). In other words, as a previously fragmented data packet was received, and the LF bit set, the parser module 210 determines that the data packet 252 is a completion data packet.

In response, the parser module 210 further provides a signal to the read-ready queue 224 (332). The signal provided to the read-ready queue 224 triggers the defragmentation engine 214 to obtain the previously received data packets 254 that are associated with the data packet 252 (334). For example, the parser module 210 examines the state memory 218 to identify the memory addresses of the previously received fragmented data packets 254. The parser module 210 provides information identifying the previously received fragmented data packets 254 within the signal provided to the read-ready queue 224.

In parallel, the parser module 210 provides a signal to the write-ready queue 222 (336). The defragmentation engine 214, in response to the signal, concatenates the data packet 252 with the previously received data packets 254 (338). In some examples, the defragmentation engine 214 concatenates the data packet 252 with the previously received data packets 254 by positioning the data packet 252 and the previously received data packet 254 in an appropriate order, e.g., based on a numeric ordering or time-based. The defragmentation engine 214, based on concatenating the data packet 252 with the previously received data packets 254, generates a concatenated data packet. The defragmentation engine 214 transmits the concatenated data packet upstream to the packet buffer 216 (340).

Figure 5:
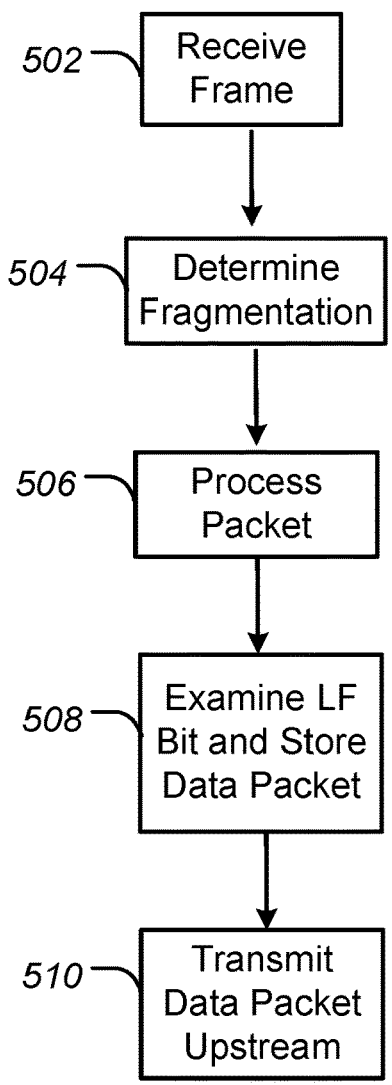
FIG. 5 depicts a flowchart of an example process for determining a state of a data packet.

FIG. 5 illustrates an example process 500 for determining a state of the data packet 252. The process 500 can be performed, for example, by the PON 200. An upstream communication frame is received by an optical line terminal (OLT) from an optical network terminal (ONT) (502). For example, the OLT 202 receives the upstream communication frame 250 from the ONT 206. In some examples, the upstream communication frame 250 includes a data packet 252 and the last fragment (LF) bit 256.

The OLT determines a fragmentation of the data packet of the upstream communication frame (504). For example, the OLT 202 determines the fragmentation of the data packet 252 of the upstream communication frame 250.

The OLT processes the data packet of the upstream communication frame based on the fragmentation of the data packet (506). For example, the OLT 202 processes the data packet 252 of the upstream communication frame 250 based on the fragmentation of the data packet 252. In some examples, the OLT 202 processes the data packet 252 by determining a state of the data packet 252. In some examples, the states of the data packet 252 can include i) a completed data packet, ii) an initial fragmented data packet, iii) a subsequent fragmented data packet, and iv) a final fragmented data packet.

In some examples, the OLT processing of the data packet can include, when the data packet is fragmented, that the OLT examines the last fragment bit of the upstream communication frame and stores, in a memory device, the data packet when the state of the data packet indicates that the last data packet is not a completion (508). For example, when the OLT 202, and specifically, the parser module 210, determines that the data packet 252 is fragmented, the parser module 210 examines the LF bit 256 of the upstream communication frame 250. The parser module 210 determines that the LF bit 256 indicates that the data packet 252 is not a completion. The defragmentation engine 214 stores the fragmented data packet 252 in the memory device 220. In some examples, the data packet 252 can be an initial fragmented data packet or a subsequently fragmented data packet.

In another example, the parser module 210 determines that the LF bit 256 indicates that the data packet 252 is a completion. In response, the defragmentation engine 214 concatenates the data packet 252 with the previously received data packets 254 that are stored by the memory device 220 and that are associated with the data packet 252, as described herein.

In some examples, the OLT processing the data packet can include, when the data packet is not fragmented, the OLT transmitting the data packet upstream without storing the data packet in the memory device (510). For example, the OLT 202, and specifically, the parser module 210, determines that the data packet 252 is not fragmented, and in response, the defragmentation engine 214 transmits the data packet 252 upstream from the cache 212 to the packet buffer 216 without storing the data packet 252 in the memory device 220.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A method, comprising:
 receiving, by an optical line terminal, an upstream communication frame from an optical network terminal, the upstream communication frame including a data packet and a last fragment bit;
 determining, by the optical line terminal, a fragmentation of the data packet of the upstream communication frame; and
 processing, by the optical line terminal, the data packet of the upstream communication packet based on the fragmentation of the data packet, including:
  when the data packet is fragmented, examining a state of a last fragment bit of the upstream communication frame, and in response:
   i) when the state of the last fragment bit indicates that the data packet is not a completion, storing, in a memory device, the data packet and updating a state of a state memory associated with the data packet; and
   ii) when the state of the last fragment bit indicates that the data packet is a completion, concatenating the data packet with one or more previously stored data packets;
  when the data packet is not fragmented, transmitting the data packet upstream without storing the data packet in the memory device.

2. The method of claim 1, further comprising storing the data packet in a cache after receiving the upstream communication frame.

3. The method of claim 1, further comprising:
 determining that the last fragment bit indicates that the data packet is a completion;
 determining that the state of the state memory indicates that a previously fragmented data packet was not received;
 based on determining that the last fragment bit indicates that the data packet is a completion and determining that the state of the state memory indicates that a previously fragmented data packet was not received:
 providing a signal to a write ready queue; and
 in response to the signal, transmitting the data packet upstream to a packet buffer without storing the data packet in the memory device.

4. The method of claim 1, further comprising
 determining that the last fragment bit indicates that the data packet is not a completion;
 determining that the state of the state memory indicates that a previously fragmented data packet was not received; and
 based on determining that the last fragment bit indicates that the data packet is not a completion and determining that the state of the state memory indicates that a previously fragmented data packet was not received, determining that the data packet is an initial fragmented data packet, and in response, i) setting an initial state of the state memory, and ii) storing, in the memory device, the data packet.

5. The method of claim 4, wherein storing, in the memory device, the data packet further comprises:
 providing a signal to a write ready queue; and
 in response to the signal, storing, in the memory device, the data packet.

6. The method of claim 1, further comprising
 determining that the last fragment bit indicates that the data packet is not a completion;
 determining that the state of the state memory indicates that a previously fragmented data packet was received; and
 based on determining that the last fragment bit indicates that the data packet is not a completion and determining that the state of the state memory indicates that a previously fragmented data packet was received, determining that the data packet is a subsequent fragmented data packet, and in response, storing, in the memory device, the data packet.

7. The method of claim 1, further comprising:
 determining that the last fragment bit indicates that the data packet is a completion;

determining that the state of the state memory indicates that a previously fragmented data packet was received;
based on determining that the last fragment bit indicates that the data packet is a completion and determining that the state of the state memory indicates that a previously fragmented data packet was received:
  i) obtaining one or more previous data packets that are previously stored in the memory device, the one or more previously stored data packets associated with the completion data packet, and
  ii) concatenating the one more previously stored data packets with the completion data packet.

8. The method of claim 7, wherein obtaining the one or more previous data packets that are stored in the memory device further comprises:
providing a signal to a read ready queue; and
in response to the signal, obtaining the one or more previously stored data packets from the memory device.

9. The method of claim 7, wherein concatenating the one or more previous data packets with the completion data packets:
providing a signal to a write ready queue; and
in response to the signal, concatenating the one more previously stored data packets with the completion data packet.

10. A system, comprising:
a parser module configured to i) receive an upstream communication frame from an optical network terminal, the upstream communication frame including a data packet and a last fragment bit and ii) determine a fragmentation of the data packet of the upstream communication frame;
a memory device configured to store the data packet of the upstream communication frame;
a state memory associated with the data packet; and
a defragmentation engine configured to:
  i) examine, when the data packet is fragmented, a state of the last fragment bit of the upstream communication frame, and in response:
    a) when the state of the last fragment bit indicates that the data packet is not a completion, store, in the memory device, the data packet and update a state of the state memory associated with the data packet,
    b) when the state of the last fragment bit indicates that the data packet is a completion, concatenate the data packet with one or more previously stored data packets; and
  ii) transmit, when the data packet is not fragmented, the data packet upstream without storing the data packet in the memory device.

11. The system of claim 10, the system further comprising a cache configured to store the data packet after receiving the upstream communication frame.

12. The system of claim 10, wherein the parser module is further configured to i) determine that the last fragment bit indicates that the data packet is a completion, and ii) determine that the state of the state memory indicates that a previously fragmented data packet was not received, and in response, provide a signal to a write ready queue, wherein the defragmentation engine is further configured to transmit the data packet upstream to a packet buffer without storing the data packet in the memory device in response to the signal.

13. The system of claim 10, wherein the parser module is further configured to i) determine that the last fragment bit indicates that the data packet is not a completion, and ii) determine that the state of the state memory indicates that a previously fragmented data packet was not received, and in response, determine that the data packet is an initial fragmented data packet, and set an initial state of the state memory.

14. The system of claim 13, in response to determining that the data packet is an initial fragmented data packet, the defragmentation engine is further configured to store, in the memory device, the data packet.

15. The system of claim 14, wherein the parser module is further configured to provide a signal to a write ready queue, wherein the defragmentation engine is further configured to store, in the memory device, the data packet in response to the signal.

16. The system of claim 10, wherein the parser module is further configured to i) determine that the last fragment bit indicates that the data packet is not a completion, and ii) determine that the state of the state memory indicates that a previously fragmented data packet was received, and in response determine that that the data packet is a subsequently fragmented data packet.

17. The system of claim 16, wherein the parser module is further configured to, in response to determining that that the data packet is a subsequently fragmented data packet, provide a signal to a write ready queue, wherein the defragmentation engine is further configured to store, in the memory device, the data packet in response to the signal.

18. The system of claim 10, wherein, the parser module is further configured to i) determine that the last fragment bit indicates that the data packet is a completion, and ii) determine that a state of a state memory indicates that a previously fragmented data packet was received, and in response to determining that the last fragment bit indicates that the data packet is the completion, the defragmentation engine is further configured to i) obtain one more previously stored data packets that are previously stored in the memory device, the one or more previously stored data packets associated with the completion data packet, and ii) concatenate the one more previous data packets with the completion data packet.

19. The system of claim 18, wherein the parser module is further configured to provide a signal to a read ready queue, wherein the defragmentation engine is further configured to obtain the one or more previously stored data packets from the memory device in response to the signal.

20. The system of claim 19, wherein the parser module is further configured to provide a signal to a write ready queue, wherein the defragmentation engine is further configured to concatenate the one or more previously stored data packets with the completion data packet.

* * * * *

UNITED STATES PATENT AND TRADEMARK OFFICE
CERTIFICATE OF CORRECTION

PATENT NO. : 10,178,207 B1
APPLICATION NO. : 15/645172
DATED : January 8, 2019
INVENTOR(S) : Jared Oldacre Page 1 of 1

It is certified that error appears in the above-identified patent and that said Letters Patent is hereby corrected as shown below:

In the Claims

In Column 11, Line 11, In Claim 7, delete "one more" and insert -- one or more --, therefor.

In Column 11, Line 24, In Claim 9, delete "one more" and insert -- one or more --, therefor.

In Column 12, Line 28, In Claim 16, delete "that that" and insert -- that --, therefor.

In Column 12, Line 31, In Claim 17, delete "that that" and insert -- that --, therefor.

In Column 12, Line 44, In Claim 18, delete "one more" and insert -- one or more --, therefor.

In Column 12, Line 48, In Claim 18, delete "one more" and insert -- one or more --, therefor.

Signed and Sealed this
Nineteenth Day of February, 2019

Andrei Iancu
*Director of the United States Patent and Trademark Office*